(12) United States Patent
Frailong et al.

(10) Patent No.: US 8,069,023 B1
(45) Date of Patent: Nov. 29, 2011

(54) HARDWARE SUPPORT FOR INSTRUCTION SET EMULATION

(75) Inventors: Jean-Marc Frailong, Los Altos, CA (US); Jeffrey G. Libby, Cupertino, CA (US); Jianhui Huang, Fremont, CA (US); Sharada Yeluri, San Jose, CA (US); Rajesh Nair, Fremont, CA (US); John Keen, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 546 days.

(21) Appl. No.: 12/202,742

(22) Filed: Sep. 2, 2008

(51) Int. Cl.
*G06F 17/50* (2006.01)

(52) U.S. Cl. .................... 703/13; 370/389; 370/392

(58) Field of Classification Search .............. 703/23, 703/13; 370/392, 351, 397, 466, 352, 328, 370/238, 400, 389, 250, 386, 409; 713/151, 713/200
See application file for complete search history.

(56) References Cited

U.S. PATENT DOCUMENTS

| | | | |
|---|---|---|---|
| 6,618,393 B1 * | 9/2003 | Chiles et al. | 370/466 |
| 7,630,358 B1 * | 12/2009 | Lakhani et al. | 370/351 |
| 2003/0031167 A1 * | 2/2003 | Singh et al. | 370/352 |
| 2003/0161309 A1 * | 8/2003 | Karuppiah | 370/392 |
| 2004/0071135 A1 * | 4/2004 | Jimmei et al. | 370/386 |
| 2004/0133796 A1 * | 7/2004 | Cohen et al. | 713/200 |
| 2005/0018682 A1 * | 1/2005 | Ferguson et al. | 370/392 |
| 2005/0122957 A1 * | 6/2005 | Ambe | 370/351 |
| 2006/0007942 A1 * | 1/2006 | Ogawa | 370/400 |
| 2006/0072574 A1 * | 4/2006 | Akahane et al. | 370/392 |
| 2006/0182034 A1 * | 8/2006 | Klinker et al. | 370/238 |
| 2007/0165622 A1 * | 7/2007 | O'Rourke et al. | 370/389 |
| 2007/0226483 A1 * | 9/2007 | Cox et al. | 713/151 |
| 2007/0291652 A1 * | 12/2007 | Oyamada | 370/250 |
| 2008/0013549 A1 * | 1/2008 | Okagawa et al. | 370/397 |
| 2008/0107126 A1 * | 5/2008 | Oguchi | 370/409 |
| 2010/0202344 A1 * | 8/2010 | Kawakami | 370/328 |

* cited by examiner

*Primary Examiner* — Kandasamy Thangavelu
(74) *Attorney, Agent, or Firm* — Harrity & Harrity, LLP

(57) ABSTRACT

A method for emulating a nexthop instruction in microcode with the assistance of dedicated hardware to extract read and write addressing from the nexthop instruction instead of performing this operation in microcode. A method for emulating a nexthop instruction in microcode with the assistance of dedicated hardware to compare a nexthop read address to a special value and to indicate whether the nexthop read address matches the special value, instead of performing this operation in microcode. A method for determining a network address by performing a single extraction of bit fields of a tree instruction to allow multiple tree search processes to be performed.

21 Claims, 14 Drawing Sheets

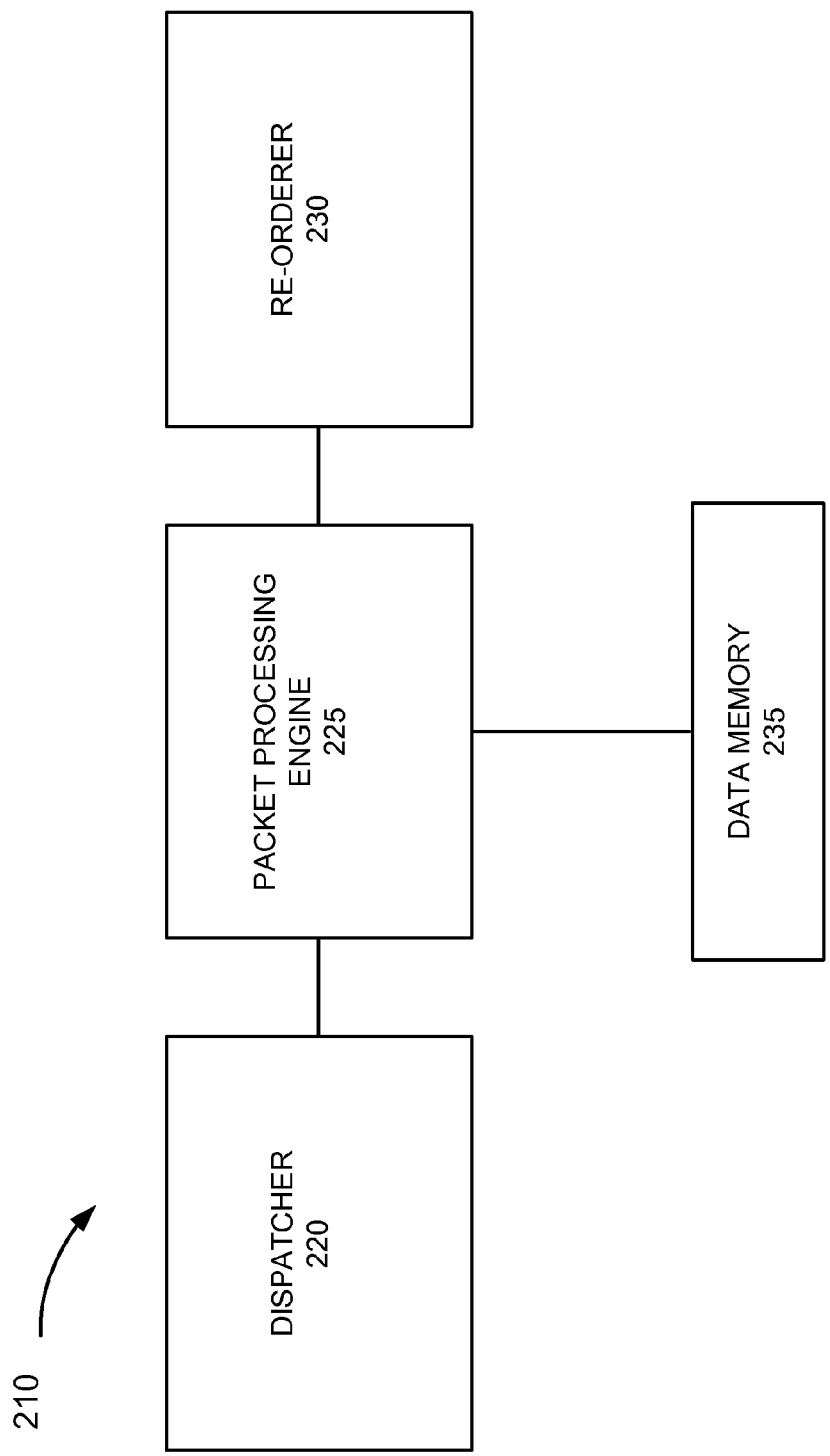

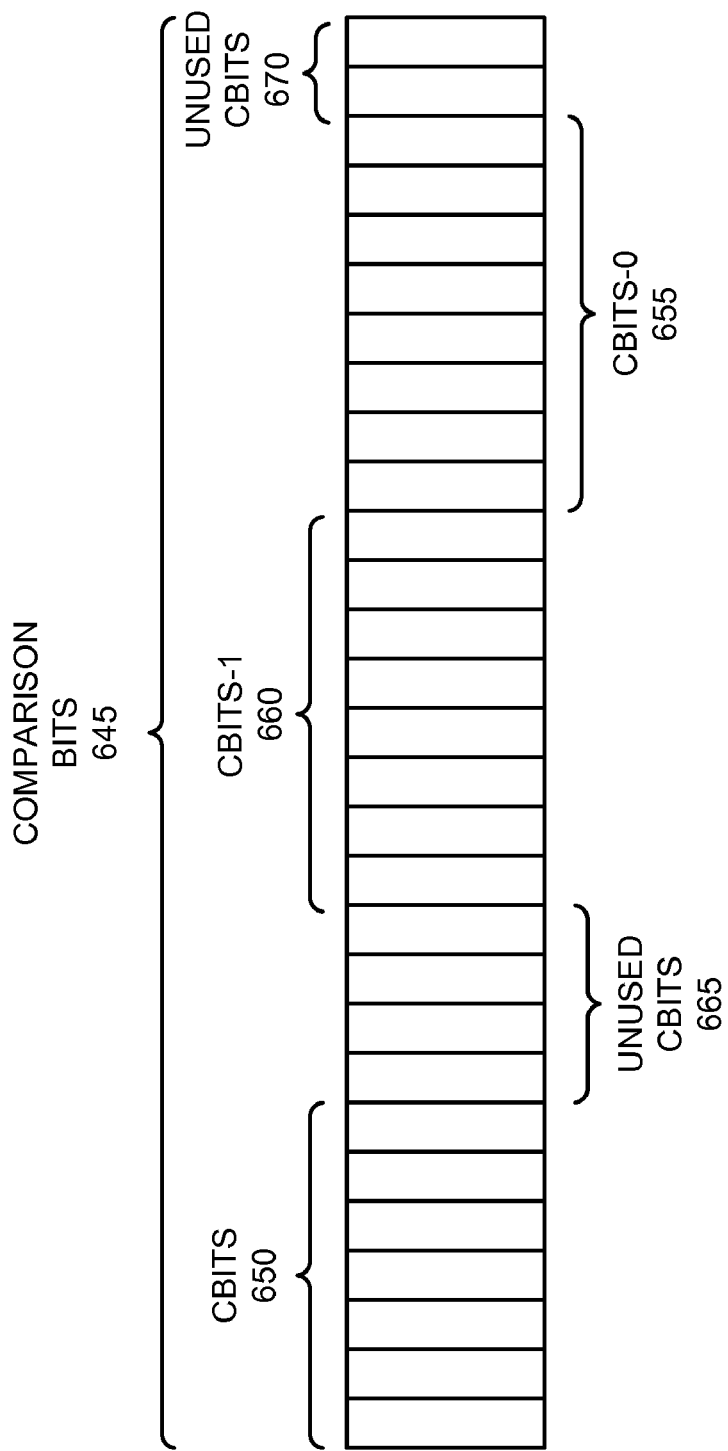

# US 8,069,023 B1

HARDWARE SUPPORT FOR INSTRUCTION SET EMULATION

BACKGROUND

Network devices, such as routers, perform various operations to route packets to their destination. A centerpiece in network device design is optimizing performance. In this regard, the development of hardware and/or software embodiments of a network device can be critical with respect to various performance metrics associated the network device. For example, instruction set design and the number of instructions to perform a particular operation can impact the performance of the network device. Additionally, shared and dedicated access to various resources (e.g., memory, processing, etc.) can impact the performance of the network device.

SUMMARY

According to one aspect, a method for emulating a nexthop instruction with dedicated hardware may include reading, by the dedicated hardware, address control information from the nexthop instruction, the address control information including information to control at least one of read addressing or write addressing of a first memory; writing, by the dedicated hardware, the address control information to a second memory to control the at least one of read addressing or write addressing of the first memory; reading from the second memory to control the at least one of read addressing or write addressing of the first memory, and determining a nexthop address based on the at least one of read addressing or write addressing of the first memory.

According to another aspect, a method for emulating a nexthop instruction with dedicated hardware may include invoking a sub-routine call based on a sub-routine field in the nexthop instruction; receiving a nexthop read request that includes a nexthop read address; comparing, by the dedicated hardware, a special value in a memory to the nexthop read address; providing, by the dedicated hardware, a result of the comparison to a packet processing engine; and executing the nexthop read request when the result of the comparison indicates that the nexthop read address does not match the special value.

According to yet another aspect, a method may include extracting a plurality of bit fields from a route lookup instruction used to perform a route lookup search in a routing address data structure, where the plurality of bit fields include a test bit field, a skipped bits field, and a comparative skipped bits field; providing the plurality of bit fields to a bit fields comparer; masking the test bit field; comparing the skipped bits field to the comparative skipped bits field; determining whether the skipped bits field matches the comparative skipped bits; determining a value of the test bit field when it is determined that the skipped bits field matches the comparative skipped bits field; and selecting a route address in the routing data structure based on the value of the test bit field.

According to still another aspect, a device may include a packet processing engine to determine a network address for routing a received packet based on an emulation of a nexthop instruction in microcode, and may include dedicated hardware that may extract an address control field from the nexthop instruction, the address control field including information to control at least one of read addressing or write addressing of a first memory, and insert the address control field information to at least one of a second memory, a field extractor, or a field inserter, and where the packet processing engine may utilize the address control field information of the second memory to control the at least one of the read addressing or the write addressing of the first memory.

According to another aspect, a device may include a routing engine to determine a network address based on an emulation of a nexthop instruction in microcode, and dedicated hardware to identify a last nexthop instruction associated with a sub-routine call, compare a nexthop read address included in a nexthop read request issued by the routing engine to a special value, and indicate whether the nexthop read address matches or does not match the special value, where the routing engine executes the nexthop read request when the nexthop read address does not match the special value, and a microinstruction is executed based on a subsequent nexthop instruction corresponding to the nexthop read address.

According to still another aspect, a device may include a packet processing engine to determine a network address based on a search of a binary tree according to one or more tree instructions, and dedicated hardware to extract a plurality of bit fields from one of the one or more tree instructions, where the plurality of bit fields include a test bit field, a skipped bits field, and a comparative skipped bits field, and provide the plurality of bit fields to a bits field comparer, where the bits field comparer determines whether the skipped bits field matches the comparative skipped bits field, and where the dedicated hardware provides the test bit field to another bits field comparer when it is determined that the skipped bits field matches the comparative skipped bits field, and the other bit field comparer determines whether the value of the test bit field is a one or a zero.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIGS. 2A and 2B are diagrams illustrating exemplary components of a network device depicted in FIG. 1;

FIG. 6B is a diagram illustrating exemplary bits included in comparison bits depicted in the K-tree instruction of FIG. 6A.

DETAILED DESCRIPTION

The following detailed description refers to the accompanying drawings. The same reference numbers in different drawings may identify the same or similar elements. Also, the following description does not limit the invention.

The term "packet," as used herein, may include, for example, a datagram, a frame, a cell, or any other type of delivery unit or mechanism.

The phrase "nexthop instruction set," as used herein, may include, for example, an instruction set that provides for route-lookup. The nexthop instruction set may support table and tree searches based on data in an incoming packet, as well as other operations, such as filtering, policing, and/or counting. The nexthop instruction set may be emulated by microcode instructions. For example, a nexthop instruction may include a reference (e.g., an opcode field) to a nexthop microcode instruction.

The phrase "K-tree instruction set," as used herein, may include for example, an instruction set that provides for a K-tree route-lookup. The K-tree instruction set may support tree searches (e.g., K-tree searches) based on data in an incoming packet. The K-tree instruction set may provide that two non-contiguous bits per K-tree node may be tested. The K-tree instruction set may also provide for exact match searches. The K-tree instruction set may be emulated by microcode instructions.

The phrase "microcode instruction," as used herein, may include, for example, code that imitates or mimics an instruction set. For example, a network device may perform various operations (e.g., a firewall rule search, a keyword tree (K-Tree) search, a nexthop selection, a sub-nexthop selection, etc.) by emulating different instruction sets based on the execution of microcode instructions. Microcode instruction or microinstruction may be used interchangeably in the description.

Embodiments described herein may provide a network device that may perform routing functions in a manner that optimizes performance. For example, in one embodiment described herein, the network device may utilize dedicated components (e.g., hardware components) to reduce a number and/or a complexity of microcode instructions associated with processing of an instruction. Additionally, or alternatively, the network device may minimize access and/or extraction operations associated with an instruction during a routing lookup process.

EXEMPLARY ENVIRONMENT

Figure 1:
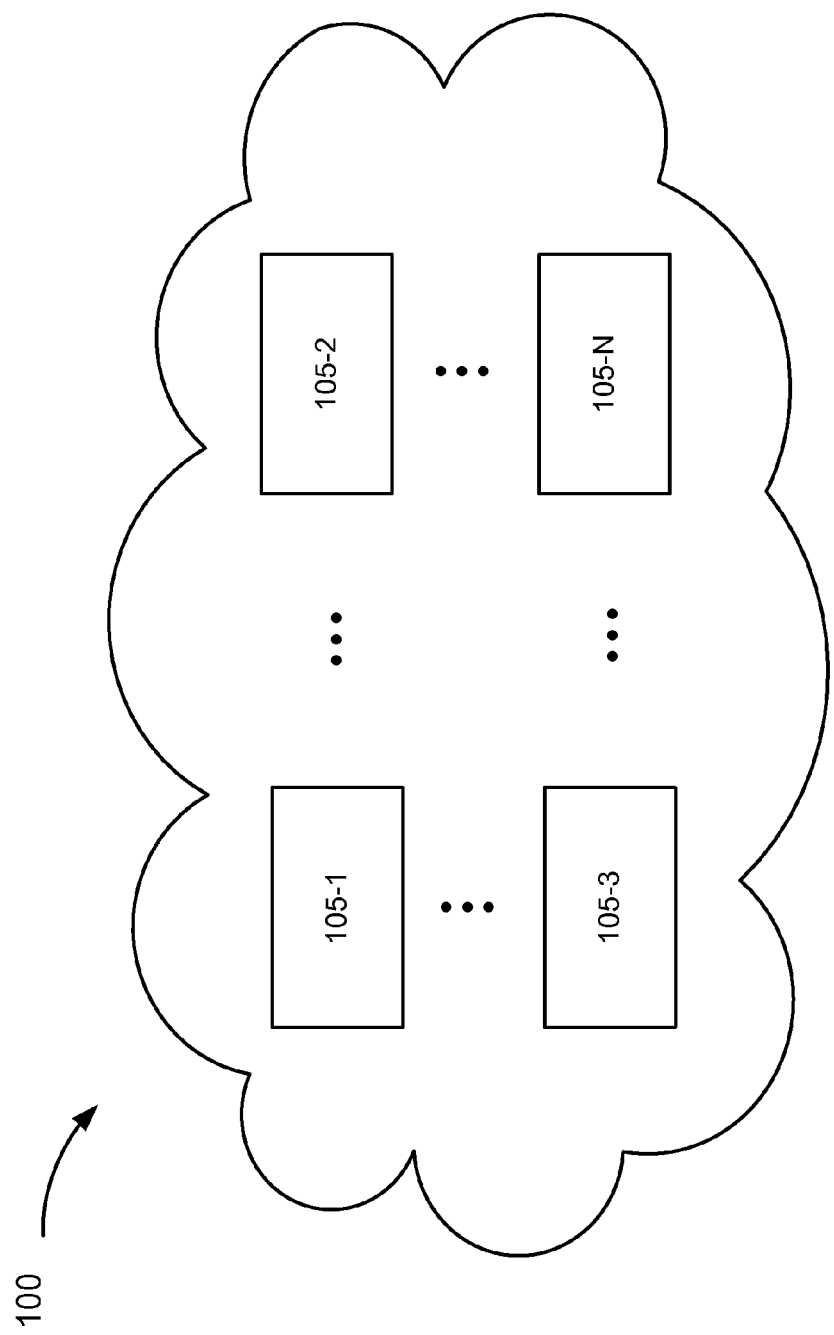
FIG. 1 is a diagram illustrating an exemplary environment in which concepts described herein may be implemented.

FIG. 1 is a diagram illustrating an exemplary environment 100 in which embodiments described herein may be implemented. As illustrated, environment 100 may include network devices 105-1 through 105-N. Network devices 105-1 through 105-N may be referred to collectively as network devices 105. Network devices 105 may be communicatively coupled. For example, network devices 105 may form one or more networks. A network may include, for example, a local area network (LAN), a wide area network (WAN), a cellular network, a mobile network, a public switched telephone network (PSTN), a private network, a public network, the Internet, an intranet, and/or a combination of networks.

Network device 105 may include, for example, a router or some other type of network device that has routing capabilities. For example, a network device that has routing capabilities may include a computer, a gateway, a switch, etc.

Although FIG. 1 illustrates an exemplary environment 100, in other embodiments, environment 100 may include fewer, additional and/or different devices than those depicted in FIG. 1. Thus, it will be appreciated that environment 100 is exemplary in terms of, among other things, the number of devices, the connections between the devices, etc. The connections in FIG. 1 may be direct, indirect, as well as wired and/or wireless.

Exemplary Network Device Architecture

Figure 2A:
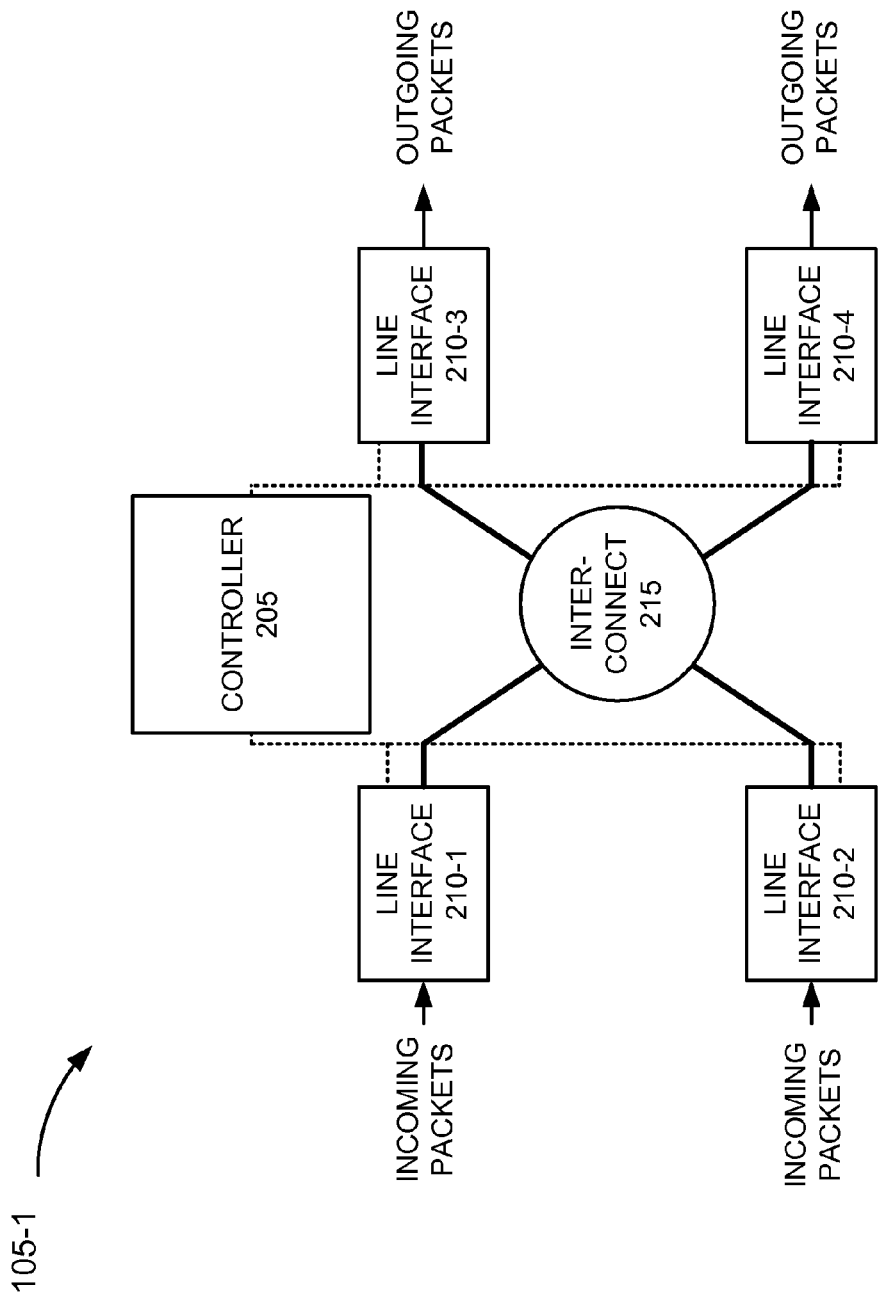

FIG. 2A is a diagram illustrating exemplary components of network device 105-1 depicted in FIG. 1. Network devices 105-2 through 105-N may be similarly configured. The term component, as used herein, may include, for example, hardware, software, software and hardware, firmware, etc. As illustrated, network device 105-1 (or alternatively referred to as network device 105) may include a controller 205, line interfaces 210-1 through 210-4 (collectively referred to as line interfaces 210), and an interconnect 215.

Controller 205 may include, for example, a component that manages, routes, and/or processes information that may require centralized processing. For example, controller 205 may process packets from other components of network device 105 and may assist in the handling of data flows. Controller 205 may include, for example, a general purpose processor, a microprocessor, a controller, a data processor, a network processor, a co-processor, an application specific integrated circuit (ASIC), a field programmable gate array (FPGA), discrete hardware components, and/or some other type of component that may interpret and/or execute instructions. Controller 205 may control one or more other components of network device 105.

Each of line interfaces 210 may include, for example, a component that receives packets and transmits packets. Each of line interfaces 210 may redirect packets to other components in network device 105. Each of line interfaces 210 may include, for example, a network interface card (NIC), a communication port, an infrared interface, a Personal Computer Memory Card International Association (PCMCIA) card, a line card, an ASIC, or another type of line interface component. Line interfaces 210 may implement industry promulgated protocol standards, non-standard protocols, proprietary protocols, and/or customized protocols.

Interconnect 215 may include, for example, a component that conveys packets between line interfaces 210. For example, interconnect 215 may include a switching fabric or another form of a connection (e.g., a bus) for conveying packets to and/or from controller 205 and/or line interfaces 210.

Although FIG. 2A illustrates exemplary components of network device 105, in other embodiments, network device 105 may include fewer, additional and/or different components than those depicted in FIG. 2A. In still other embodiments, one or more components of network device 105 may perform one or more other tasks described as being performed by one or more other components of network device 105. Network device 105 may be capable of providing services not specifically described herein. For example, network device 105 may be capable of providing authentication services, encryption/decryption services, firewall services, and/or other types of communication-related services.

Exemplary Line Interface Architecture

FIG. 2B is a diagram illustrating exemplary functional components of each of line interfaces 210. As illustrated, each of line interfaces 210 may include a dispatcher 220, a packet processing engine (PPE) 225, a re-orderer 230, and a data memory 235.

Dispatcher 220 may include, for example, a component that serves packets or portions of packets (e.g., headers of packets) to PPE 225. Dispatcher 220 may select a particular PPE 225 based on load conditions of PPE 225. Dispatcher 220 may store a packet or a portion of a packet in a memory associated with PPE 225 (e.g., local memory 305-1 in FIG. 3). Dispatcher 220 may receive an indication (e.g., a signal) from re-orderer 230 that the packet or the portion of the packet has been processed by PPE 225. Dispatcher 220 may re-utilize resources for other incoming packets based on this indication.

PPE 225 may include, for example, a component that provides for input, route lookup, and output processing of packets. PPE 225 may consult data memory 235 to perform routing lookups, classification of packets (e.g., for security purposes), policy-based routing, quality of service (QoS) routing, filtering of packets, and other forms of packet processing (e.g., packet statistical processing, accounting, and/or encapsulation). PPE 225 may perform one or more packet processing operations (e.g., packet parsing, route lookup, packet rewriting, nexthop determinations, K-Tree determinations, and/or firewall determinations) based on microinstructions. The microinstructions may be generated by compiling source code for an application or part of an operation system (OS), such as, for example, Juniper Operating System (JUNOS), Cisco Internet Operating System (IOS), and the like. PPE 225 may execute the microinstructions in one or more processes or threads.

Re-orderer 230 may include, for example, a component that retrieves the packets or portions of the packets from a memory associated with PPE 225 (e.g., local memory 305-1 in FIG. 3) if the PPE processes are completed. Re-orderer 230 may manage the order of the packets or portions thereof when the packets or the portions of the packets are associated with the same packet flow (i.e., data flow). Re-orderer 230 may pass the packets or the portions of the packets for output by network device 105.

Data memory 235 may include, for example, a component that stores various types of data related to packet processing. For example, data memory 235 may store a forwarding information base (FIB), a K-tree (e.g., a binary tree for route lookup), hash table data structures, counters, routing policies, and instruction sets (e.g., nexthop instruction sets, K-tree instruction sets, etc.).

Although FIG. 2B illustrates exemplary functional components of line interface 210, in other embodiments line interface 210 may include fewer, additional, and/or different functional components than those depicted in FIG. 2B. In still other embodiments, one or more functional components of line interface 210 may perform one or more other tasks described as being performed by one or more other functional components of line interface 210. Additionally, dispatcher 220, PPE 225, re-orderer 230, and/or data memory 235 may be implemented in a component of network device 105, other than line interface 210.

Exemplary Packet Processing Engine Architecture

Figure 3:
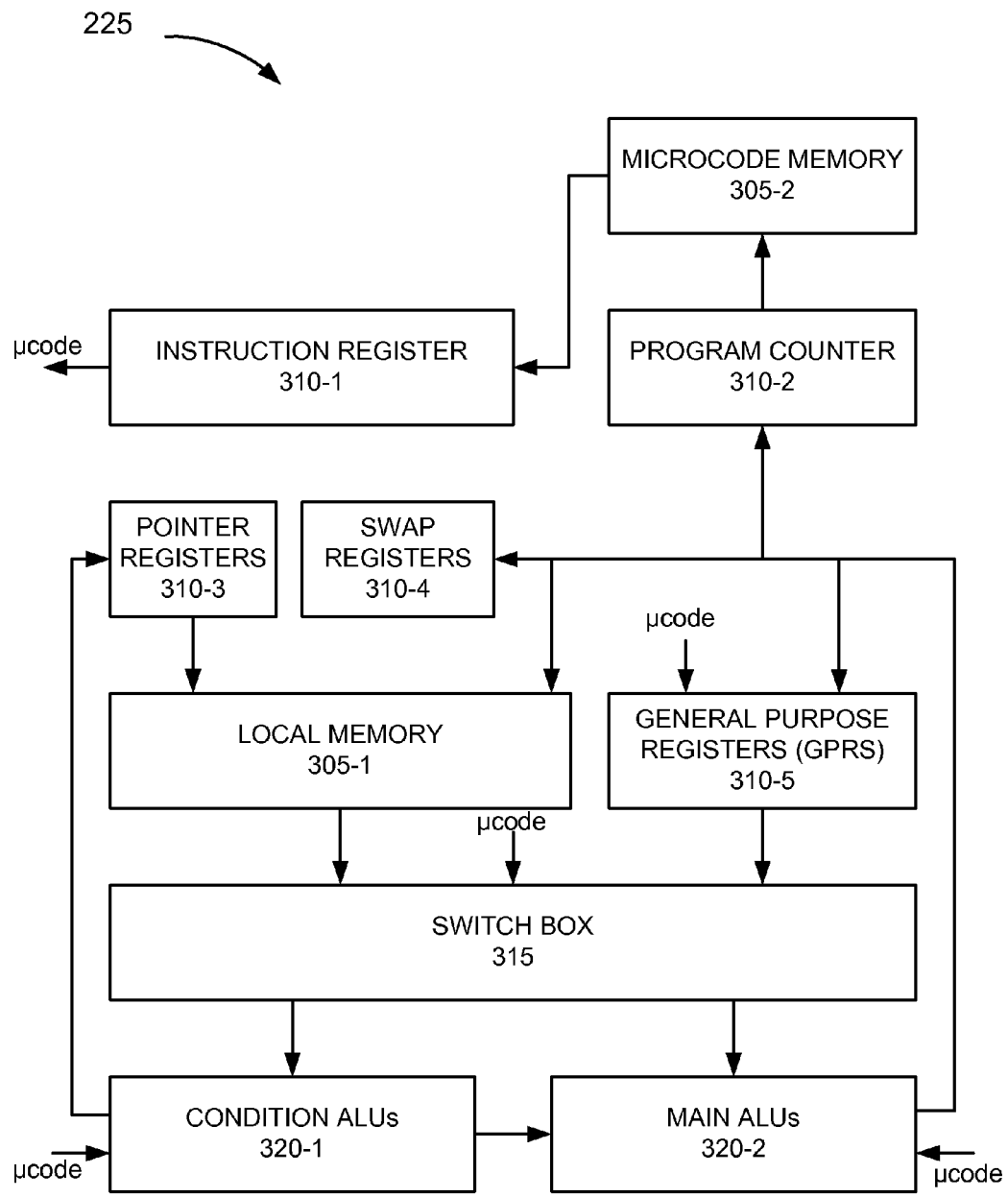
FIG. 3 is a diagram illustrating exemplary components of a packet processing engine depicted in FIG. 2B.

FIG. 3 is a diagram illustrating exemplary functional components of PPE 225. As illustrated, PPE 225 may include a local memory 305-1, a microcode memory 305-2, an instruction register 310-1, a program counter 310-2, pointer registers 310-3, swap registers 310-4, general purpose registers (GPRs) 310-5, a switch box 315, condition arithmetic logic units (ALUs) 320-1, and main ALUs 320-2.

Local memory 305-1 may include a memory device that may store packet-related information (e.g., packet headers), configuration data, and/or constants. Microcode memory 305-2 may include a memory device that may store microinstructions. In some embodiments, microcode memory 305-2 may be configured to store very long instruction word (VLIW) instructions.

Instruction register 310-1 may include a memory device that may store a currently executing instruction, which may have been retrieved from microcode memory 305-2. Program counter 310-2 may include a memory device that may store an address of currently executing microcode, and may be used to push/receive the address onto/from a call stack. In another embodiment, program counter 310-2 may be used to calculate an address of next microcode to be loaded into instruction register 310-1.

Pointer registers 310-3 may include a memory device that may store information that may be used to access local memory 305-1. For example, contents of pointer registers 310-3 may designate a specific address in local memory 305-1. Pointer registers 310-3 may accept output from condition ALUs 320-1.

Swap registers 310-4 may include a memory device that may include information for accessing a target instruction within an instruction set in data memory 235. By use of swap registers 310-4, a set of instructions may be "swapped in" for execution. In another embodiment, different types of storage (e.g., dynamic memory, onboard cache, etc.) may be used in place of swap registers 310-4.

General purpose registers (GPRs) 310-5 may include a memory device that may store data and/or addresses. Specific fields within a microinstruction may select specific GPRs 310-5 that feed buses into switch box 315. Switch box 315 may include a multiplexer or similar mechanism for selecting data from specific buses (e.g., buses from GPRS 310-5, data memory 235, local memory 305-1, etc.). The selected data may be directed to other components, such as, for example, condition ALUs 320-1 or main ALUs 320-2.

Condition ALUs 320-1 may include a component that performs arithmetic operations and/or logical operations. For example, condition ALUs 320-1 may include an arithmetic logic unit. Condition ALUs 320-1 may compute conditions that drive branch decisions in a microinstruction or may be input to another component of PPE 225 (e.g., main ALUs 320-2 and/or other registers (not illustrated)). Condition ALUs 320-1 may include field extractors to extract arbitrary bit fields located at any bit position of a bit series (e.g., a microcode instruction).

Condition ALUs 320-1 may perform, for example, arithmetic operations (e.g., addition, subtraction, arithmetic comparisons, etc.) and/or logical operations (e.g., masking, shifting, etc.) on fields and sub-fields of a microinstruction, contents of GPRs 310-5, a portion of local memory 305-1, data memory 235, and constants (e.g., numbers, strings, etc.) from a memory (not shown). In addition, condition ALUs 320-1 may drive the selection of the next microinstruction in microcode memory 305-2.

Main ALUs 320-2 may include a component that performs arithmetic and/or logical operations. For example, main ALUs 320-2 may include an arithmetic logic unit. Main ALUs 320-2 may perform various arithmetic operations (e.g., addition, subtraction, etc.) and/or logical operations (e.g., AND, OR, Exclusive OR, etc.) on fields and sub-fields of a microinstruction, contents of GPRs 310-5, a portion of local memory 305-1, data memory 235, output from condition ALUs 320-1, and constants from a memory (not shown). The output of main ALUs 320-2 may be written to various components of PPE 225 (e.g., GPRs 310-5, data memory 235, local memory 305-1, and/or swap registers 310-4). Main ALUs 320-2 may include field extractors to extract arbitrary bit fields located at any bit position of a bit series, as well as field inserters to, for example, align bit(s), perform bit shifts, etc.

In an exemplary operation of PPE 225, a microinstruction may be read into instruction register 310-1. Various fields of the microinstruction in instruction register 310-1 may select specific GPRs 310-5, a portion of local memory 305-1, and/or a portion of data memory 235. In addition, the microinstruction may drive computations at condition ALUs 320-1 and main ALUs 320-2.

Although FIG. 3 shows exemplary functional components of PPE 225, in other embodiments, PPE 225 may include fewer, different, or additional functional components than depicted in FIG. 3. For example, PPE 225 and/or network device 105 may include K-tree registers and/or nexthop registers. Furthermore, PPE 225 may include different connections between components than the connections of the components depicted in FIG. 3. In still other embodiments, one or more functional components of PPE 225 may perform one or more other tasks described as being performed by one or more other functional components of PPE 225.

Exemplary Nexthop Instruction Processes and Arrangements

As previously described, network device 105 (e.g., PPE 225) may operate according to various instruction sets. For example, network device 105 may perform various packet processing operations based on nexthop instructions. The nexthop instructions may provide a basis to carry out route lookup operations. While nexthop instructions may be emulated with microcode instructions, certain operations may be performed by dedicated components to reduce the number and/or the complexity of microcode instructions associated with the processing of a nexthop instruction. FIGS. 4A, 4B, 5A and 5B illustrate exemplary processes and arrangements associated with nexthop instructions that may be performed by these dedicated components.

Figure 4A:
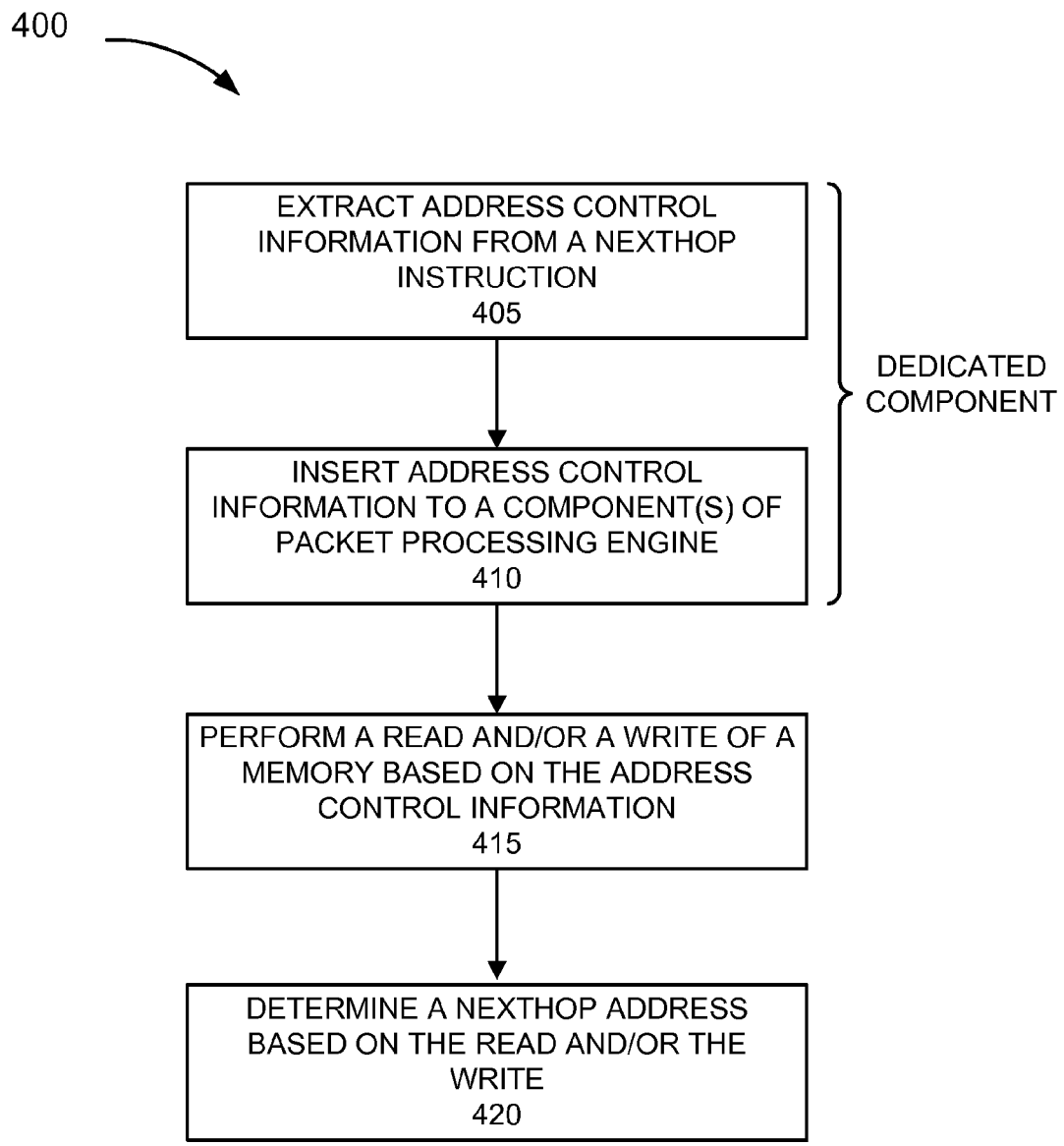
FIGS. 4A-5B are diagrams illustrating exemplary embodiments for processing nexthop instructions executed in the network device.
Figure 4B:
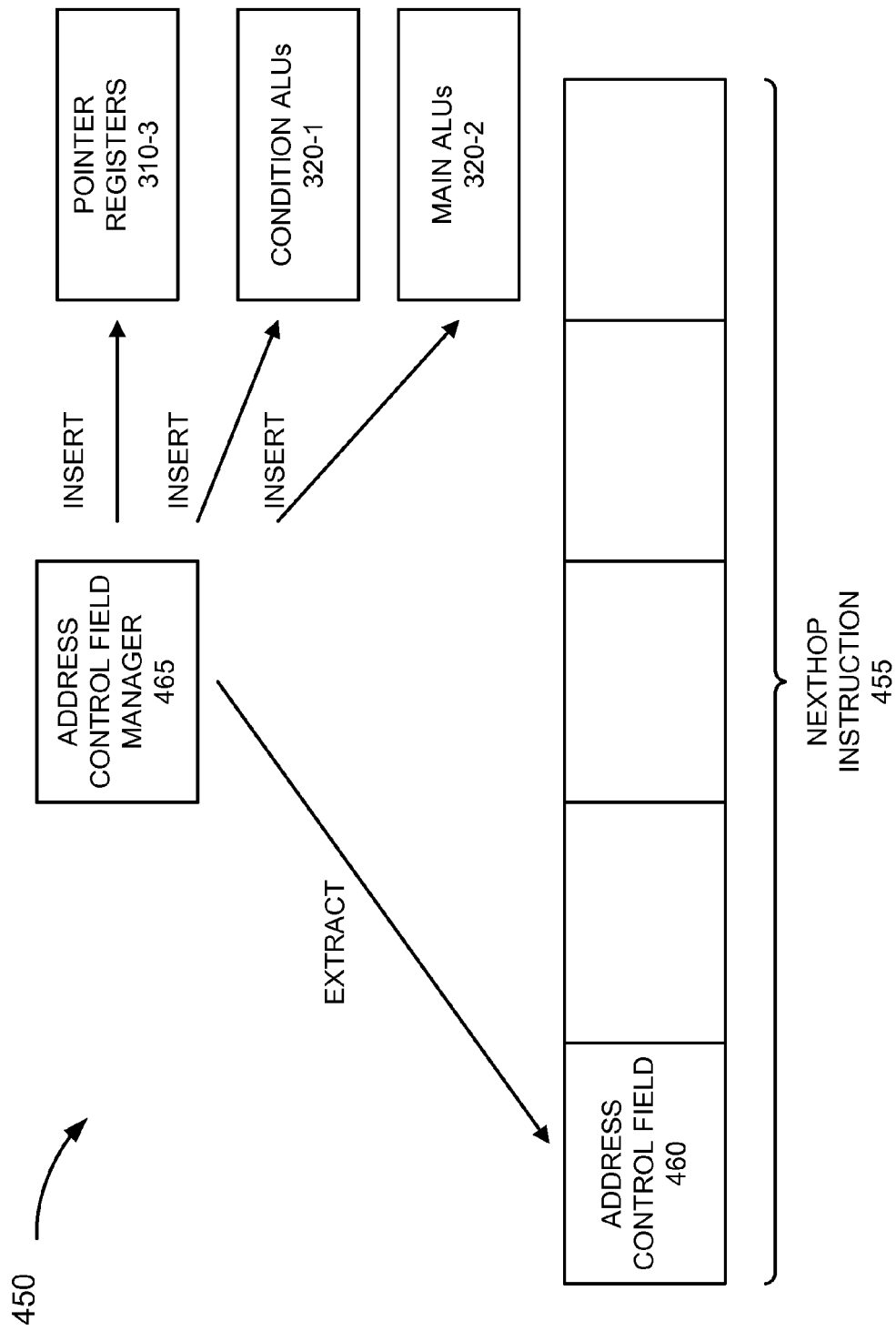

FIG. 4A is a flow diagram illustrating an exemplary process 400 for processing a nexthop instruction 455. FIG. 4B is a diagram illustrating an exemplary arrangement 450 for processing nexthop instruction 455. In this example, the processing may involve the control of read/write addressing of local memory 305-1, as well as other processes performed by PPE 225.

Referring to FIG. 4A, process 400 may begin with extracting address control information from a nexthop instruction (block 405). For example, as illustrated in FIG. 4B, nexthop instruction 455 may include an address control field 460. Address control field 460 may include information that may be utilized to control read/write addressing of local memory 305-1, as well as other processes performed by PPE 225. Address control field manager 465 may include, for example, a dedicated component (e.g., a hardware component). As illustrated in FIG. 4B, in one embodiment, address control field manager 465 may extract (e.g., read) information from address control field 460 of nexthop instruction 455.

Referring to FIG. 4A, the address control information may be inserted into component(s) of PPE 225 (block 410). For example, as illustrated in FIG. 4B, address control field manager 465 may provide the extracted information to various components of PPE 225. For example, address control field manager 465 may insert (e.g., write) address control field 460 information to pointer registers 310-3. As previously described, pointer registers 310-3 may store addresses for reading and/or writing to local memory 305-1. Additionally, or alternatively, address control field manager 465 may insert address control field 460 information in field extractors, field inserters, and/or other registers (not illustrated) associated with condition ALUs 320-1 and/or main ALUs 320-2.

Returning to FIG. 4A, a read and/or a write of a memory based on the address control information may be performed (block 415). For example, PPE 225 may read and/or write to local memory 305-1 based on the address control information stored in pointer registers 310-3. Additionally, or alternatively, field extractors, field inserters, and/or other registers associated with condition ALUs 320-1 and/or main ALUs 320-2, may utilize the address control information to, for example, determine an address offset associated with reading or writing to a memory, such as local memory 305-1. Address control information may also be used to specify the bit offset value to field extractors and inserters so that specific bit-fields may be extracted and/or inserted.

A nexthop address may be determined based on the read and/or the write to the memory (block 420). For example, PPE 225 may determine a nexthop address based on the read from local memory 305-1. For example, a bit or bit-field extracted from the data read from local memory 305-1 may be used to specify an offset into a table of nexthop instructions, where the address of the table may be provided by the current next instruction. Additionally, or alternatively, for example, a bit-field extracted from local memory 305-1 may be compared to one or more data value(s) read from data memory 235, and the comparison result used to select from one of two or more alternate nexthop addresses to use to fetch the subsequent nexthop instruction. Nexthop instruction 455 may include information that points to a subsequent nexthop instruction or a block of data that includes a subsequent nexthop instruction.

Based on the operations performed by address control field manager 465, PPE 225 may, for example, perform read/write operations in local memory 305-1 more readily than if such corresponding operations were carried out by processing address control field 460 in microcode. Additionally, PPE 225 may determine a nexthop address based on the insertion of address control field 460 information in the various components of PPE 225.

Figure 5A:
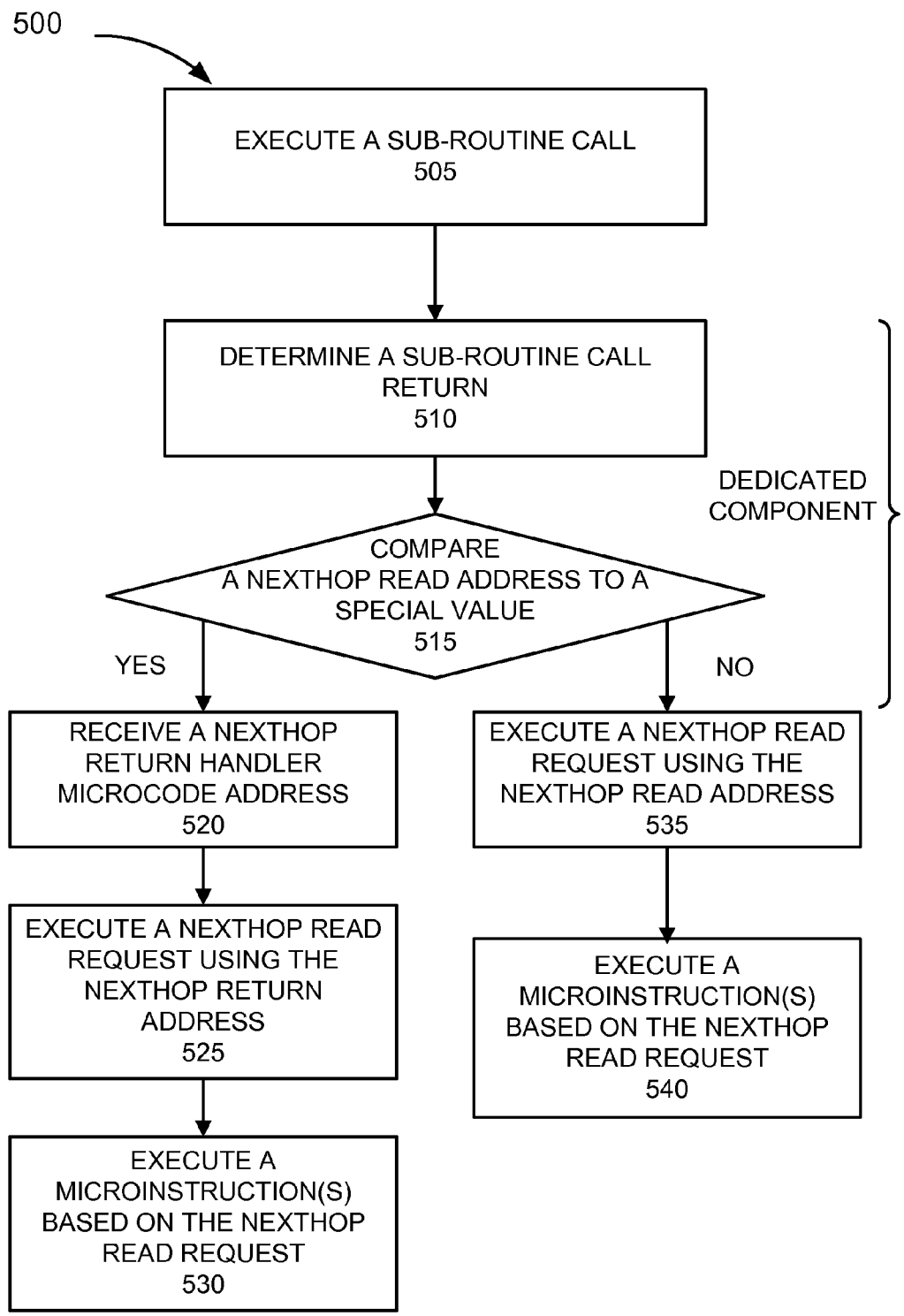
Figure 5B:
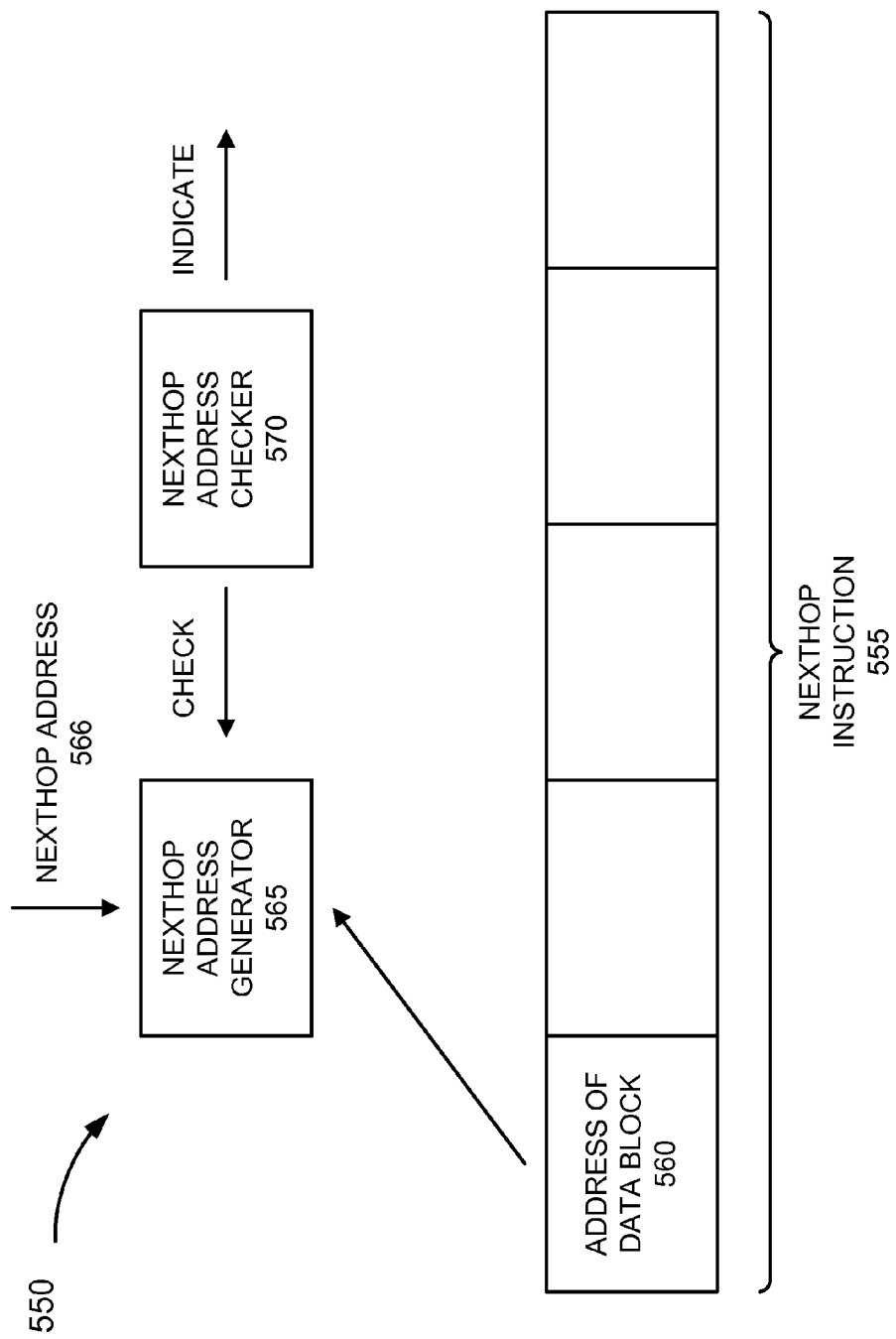

FIG. 5A is a flow diagram illustrating an exemplary process 500 for processing a nexthop instruction 555. FIG. 5B is a diagram illustrating an exemplary arrangement 550 for processing nexthop instruction 555. In this example, the processing may involve managing a return of a sub-routine call.

As previously described, a nexthop instruction, such as nexthop instruction 555, may include information that points to a subsequent nexthop instruction or a block of data that includes a subsequent nexthop instruction. In this regard, a nexthop instruction set may be considered an executable data structure. That is, each nexthop instruction may include a pointer to a following nexthop instruction to be executed.

Nexthop instruction 555 may be stored in data memory 235. During a nexthop process, PPE 225 may issue a nexthop read request which may involve comparing a read address to a special value (e.g., a constant value (e.g., 0xffffff)). When the nexthop read address is any other value than the special value, the nexthop read request may be issued and executed. The nexthop instruction that is read, based on the nexthop read address, may include a reference to, for example, a nexthop table. The nexthop table may include a set of microinstructions. For example, the set of microinstructions may correspond to a set of first microinstructions for each possible nexthop opcode. The opcode value of the nexthop instruction may provide for the selection of which microinstruction to execute from the nexthop table of first microinstructions.

On the other hand, if the nexthop read address matches the special value, PPE 225 may begin executing microinstructions based on an address received from, for example, a nexthop return handler component (not illustrated). The nexthop return handler (e.g., a microcode routine) may pop a nexthop return address off a nexthop return stack when it receives an indication that the nexthop read address matches the special value. A nexthop return handler pointer (not illustrated) may provide a starting address of the nexthop return handler routine. The nexthop instruction corresponding to the returned address may be read from data memory 235. The nexthop instruction that is read may include a reference to the nexthop table, and the nexthop table may include a microinstruction that may be executed.

Referring to FIG. 5A, a sub-routine call may be executed (block 505). For example, as illustrated in FIG. 5B, an address of data block 560 may include an address of a data block that includes one or more nexthops. Nexthop address generator 565 may involve executing a series of nexthop instructions from a sub-routine stack beginning at a particular address. For example, a component (e.g., a nexthop address selector (not illustrated)) may provide nexthop address generator 565 with a nexthop address 566 of data block 560. PPE 225 may execute a series of nexthop instructions based on the pointers in each nexthop instruction.

A sub-routine call return may be determined (block 510). For example, as illustrated in FIG. 5B, a nexthop address checker 570 may include, for example, a dedicated component (e.g., a hardware component) to check for a sub-routine call return. That is, when a last nexthop instruction is executed in connection with nexthop address generator 565, nexthop address checker 570 may identify a sub-routine call return. In some instances, a subsequent nexthop instruction may need to be read.

A nexthop read address and a special value may be compared (block 515). As previously described, during a nexthop process (e.g., after a sub-routine call return), PPE 225 may issue a nexthop read request. Nexthop address checker 570 may compare a nexthop address included in the nexthop read request with a special value (e.g., a constant value). If the nexthop read request (i.e., the nexthop read address) matches the special value (block 515-YES), a nexthop return handler microcode address may be received (block 520). For example, nexthop address checker 570 may provide an indication to PPE 225 that the nexthop read address matches the special value. In this instance, for example, the nexthop return handler may provide another nexthop return address to PPE 225. For example, the nexthop return handler may pop a nexthop return address off a nexthop return stack when it receives an indication that the nexthop read address matches the special value.

A nexthop read request using the nexthop return address may be executed (block 525). The nexthop instruction corresponding to the next return address may be read from data memory 235. The nexthop instruction that is read may include a reference to the nexthop table.

A nexthop microinstruction(s) may be executed based on the nexthop read request (block 530). The nexthop return address may reference the nexthop table that may include a nexthop microinstruction(s) that may be executed. PPE 225 may execute the corresponding nexthop microinstruction(s).

If the nexthop read request (i.e., the nexthop read address) does not match the special value (block 515-NO), the nexthop read request issued by PPE 225 may be executed (block 535). For example, nexthop address checker 570 may provide an indication to PPE 225 that the nexthop read address does not match the special value. In this instance, for example, the issued nexthop read request may be executed. A nexthop read address may reference a nexthop table.

A nexthop microinstruction(s) may be executed based on the nexthop read request (block 540). The nexthop table may include a nexthop microinstruction(s). PPE 225 may execute the corresponding nexthop microinstruction(s) (block 540).

Based on the operations performed by nexthop address generator 565 and nexthop address checker 570, PPE 225 may, for example, manage the return of sub-routine calls more readily than if such corresponding operations were carried out in microcode.

Exemplary K-Tree Instruction Processes

PPE 225 may perform K-tree searches based on K-tree instructions. The K-tree may correspond to a tree data structure that may include branches and leaf nodes. The leaf nodes may include addresses. PPE 225 may utilize the K-tree instructions to perform route lookup (e.g., longest prefix match, exact match, traverse the K-tree, etc.). FIGS. 6A through 7D illustrate exemplary processes associated with K-tree instructions.

Figure 6A:
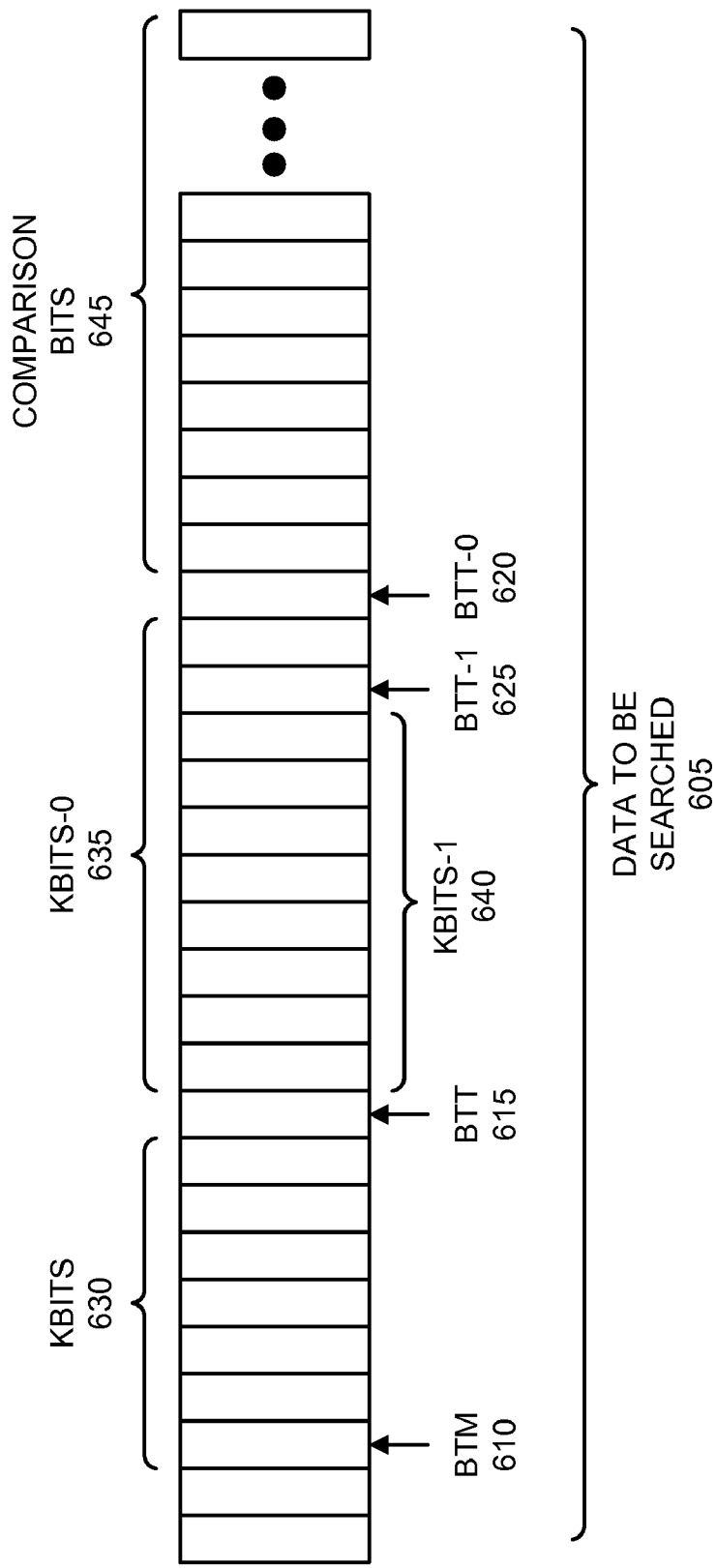
FIG. 6A is a diagram illustrating an exemplary K-tree instruction.

FIG. 6A is a diagram illustrating exemplary data 605 to be searched during route look-up. As illustrated, data 605 may include a bit-to-match (BTM) 610, a bit-to-test (BTT) 615, a BTT-0 620, a BTT-1 625, key bits (kbits) 630, kbits-0 635, kbits-1 640, and comparison bits 645. Kbits 630, kbits-0 635 and kbits-1 640 may reside in, for example, local memory 305-1. Comparison bits 645 may be included with a K-tree instruction. The K-tree instruction may also include BTT 615, BTT-0 620, and BTT-1 625.

BTM 610 may include a bit pointer that points to a bit (e.g., of an address) that has not been examined during a route lookup. During the process of executing a tree search on a particular address, a comparison on bits that have been skipped may be performed. For example, the K-tree may include an address (e.g., "10.4.3.2") and another address (e.g., "10.1.3.2"). An incoming packet may include an address (e.g., "10.4.3.1"). A differential bit between 10.4.3.2 and 10.1.3.2 may be the thirteenth bit. That is, during the tree search, bits "00001010" that represent "10" in the address may be skipped and since bits "00001000" represent "4," the first four bits (i.e., "0000") may also be skipped. Thus, a total of twelve bits may be skipped. Kbits 630 of data 605 may correspond to these skipped bits. Kbits 630 may be compared to a value of cbits included in comparison bits 645 to ensure that the bits match up to (i.e., leading up to) BTM 610. Comparison bits 645 will be described in greater detail below in connection with FIG. 6B. When the comparison yields a match, the tree search may perform a bit test based on BTT 615 to know which way to traverse the K-tree. BTT 615 may correspond to the thirteenth bit, and the branches may correspond to whether the value is a "1" or a "0." On the other hand, when the comparison does not a yield a match between kbits 630 and the cbits in comparison bits 645, the K-tree route lookup process may return to a last match of bits, or if no match exists, a default address.

In the case that a match exists, depending on the way the K-tree is traversed (e.g., which branch is traversed) by the tree search process, BTT-0 620 or BTT-1 625 may include the next bit to test, respectively, depending on whether BTT 615 is a "0" or a "1." Similarly, kbits-0 635 and kbits-1 640 may correspond to skipped bits. Kbits-0 635 and kbits-1 640 may be compared to cbits-0 and cbits-1 included in comparison bits 645, which will be described below. Kbits-0 635 and kbits-1 640 may have independent bit lengths. Additionally, BTT-0 620 and BTT-1 625 may or may not indicate the same next bit to test.

Although FIG. 6A illustrates an exemplary K-tree instruction 605, in other embodiments, data 605 may be different. For example, depending on the addresses included in the K-tree and the address of the incoming packet, the representation of BTM 610, BTT 615 etc., may be different than the bit representations depicted in FIG. 6A. For example, BTT 615 may be a relative bit offset from BTM 610. Thus, where kbits 630 is of zero bit length, BTT 615 and BTM 610 may be the same bit. Additionally, the number of bits with respect to each bit-field (e.g., kbits 630, etc.) and/or the relative position of bit fields are exemplary.

FIG. 6B is a diagram illustrating exemplary sub-fields included in comparison bits 645. As illustrated, comparison bits 645 may include cbits 650, cbits-0 655, cbits-1 660, unused cbits 665, and unused cbits 670. Cbits 650, cbits-0 655, and cbits-1 660 may be bits having values for comparison with kbits 630, kbits-0 635, and kbits-1 640, respectively. As described in greater detail below, unused cbits 665 and 670 may correspond to extra bits that may be utilized during the kbits 630, kbits-0 635, and kbits-1 640 comparisons.

Based on data 605, PPE 225 may perform various processes during route lookup in the K-tree. FIGS. 7A through 7D illustrate these exemplary operations.

Figure 7A:
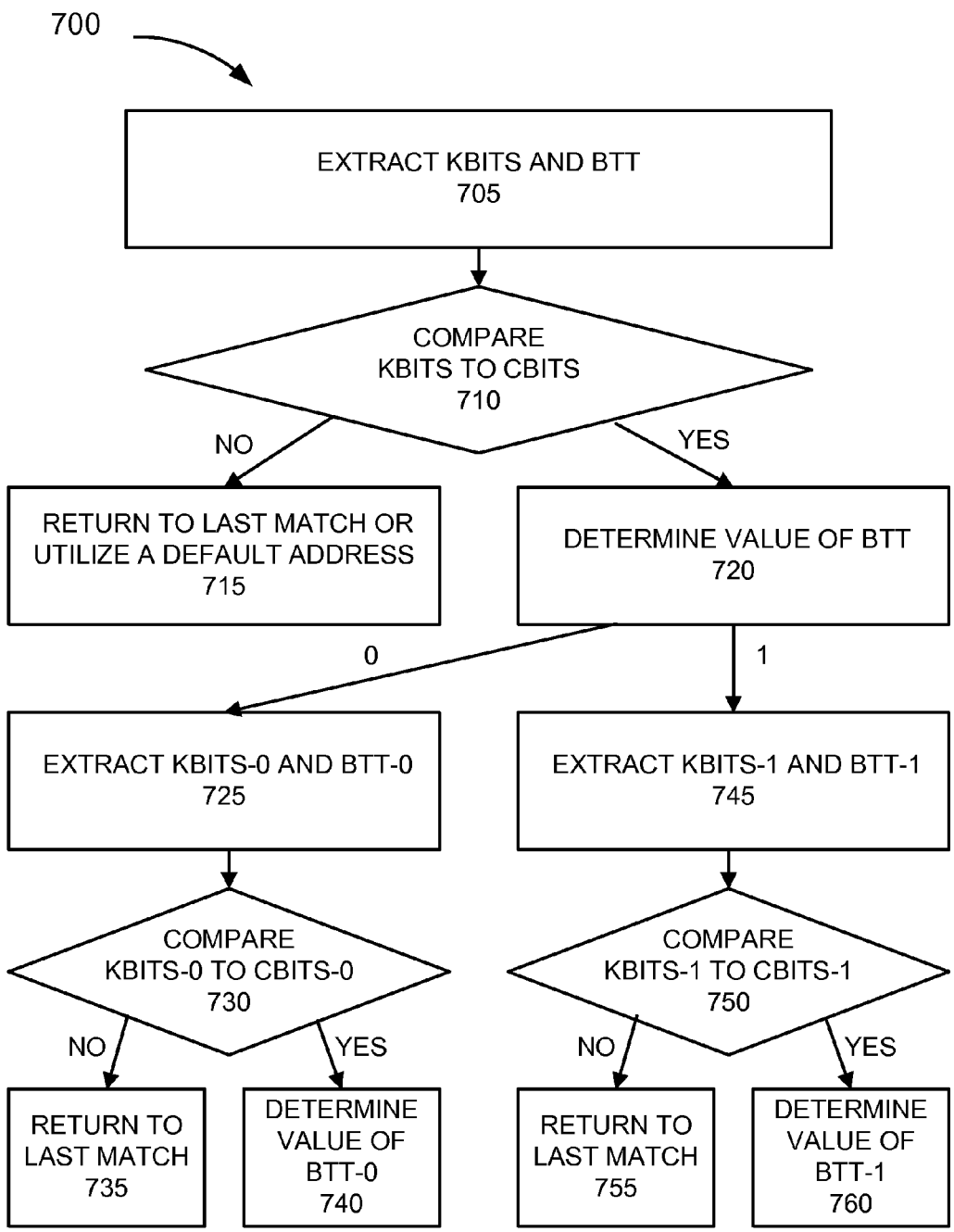
FIGS. 7A-7D are diagrams illustrating exemplary embodiments for processing the K-tree instruction depicted in FIGS. 6A and 6B.
Figure 7B:
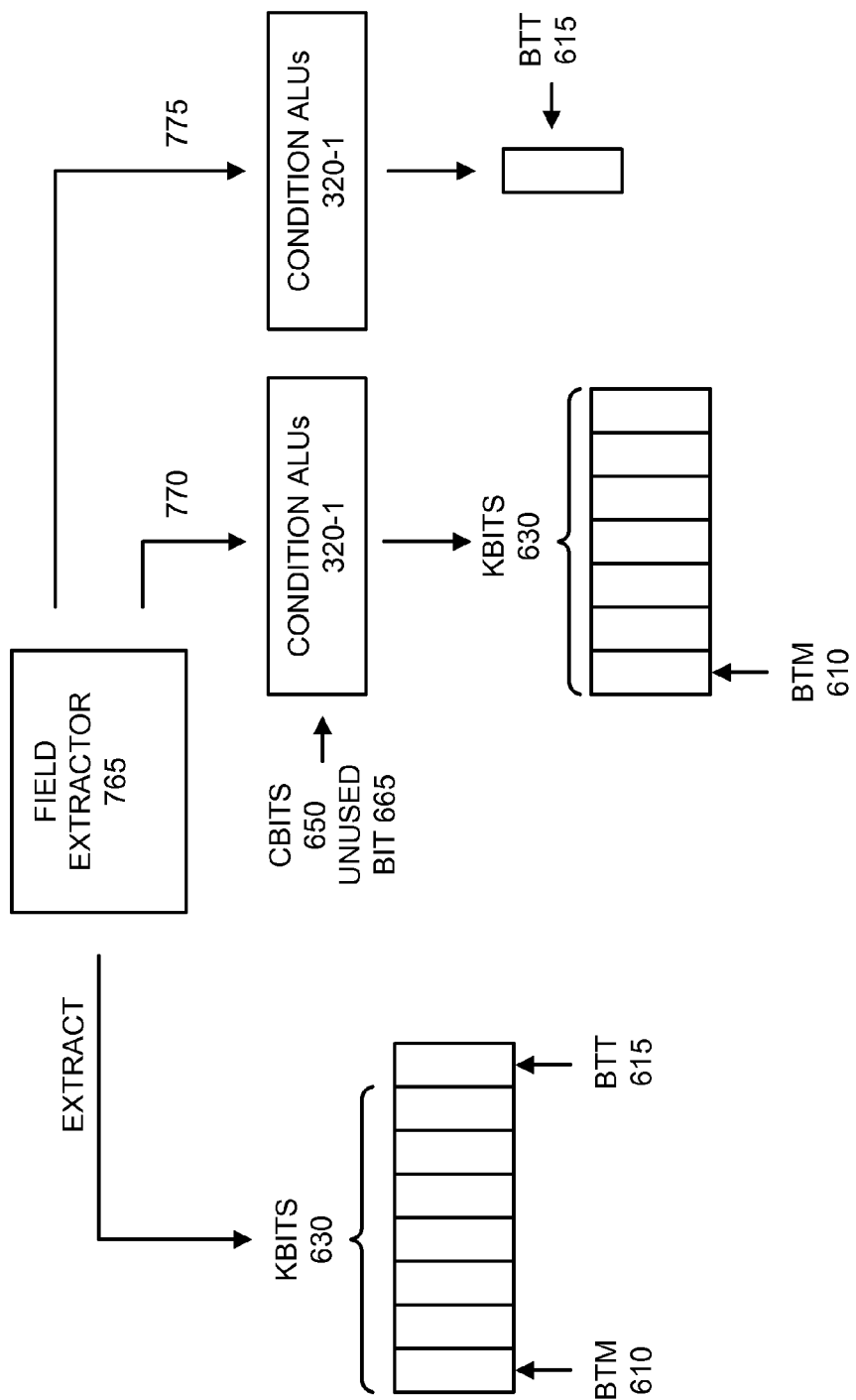
Figure 7C:
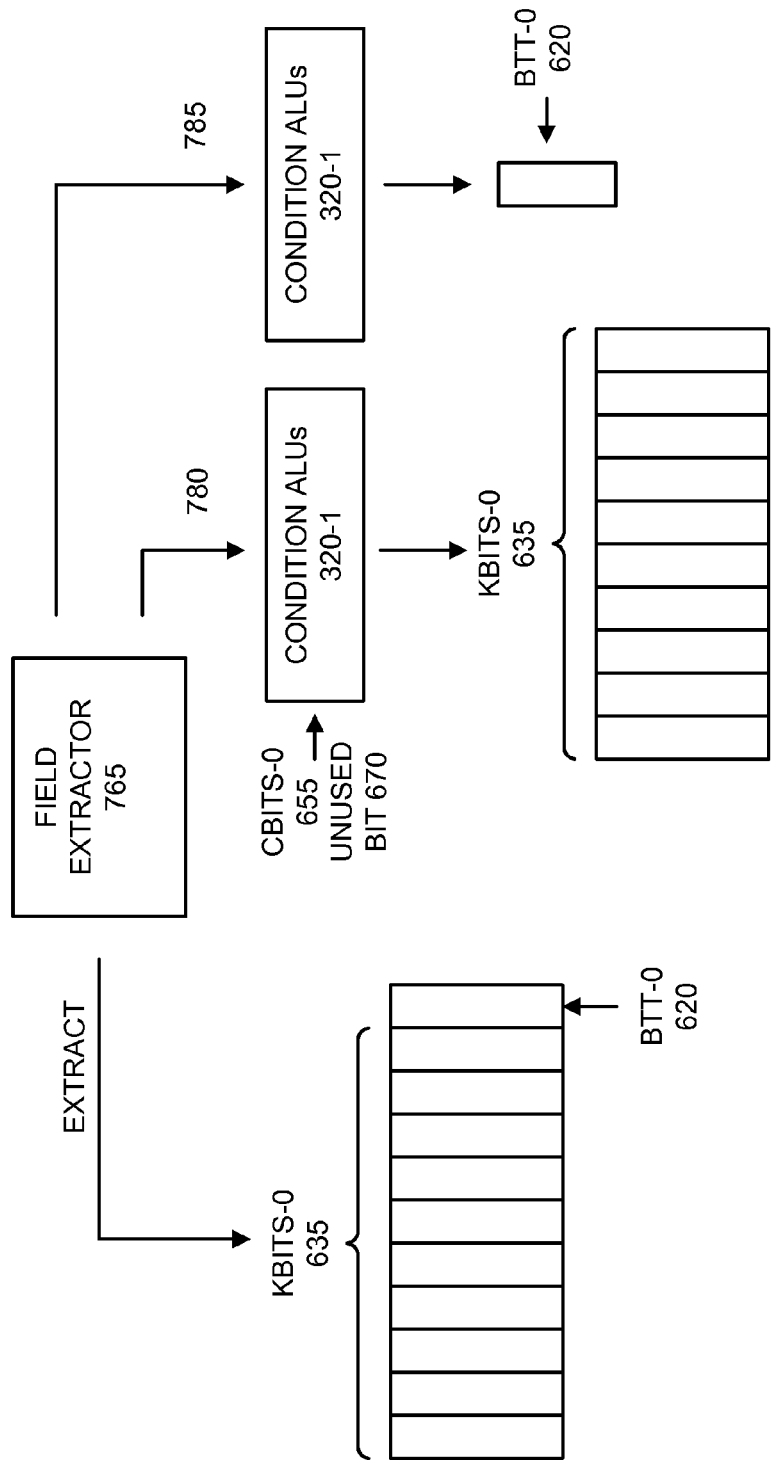
Figure 7D:
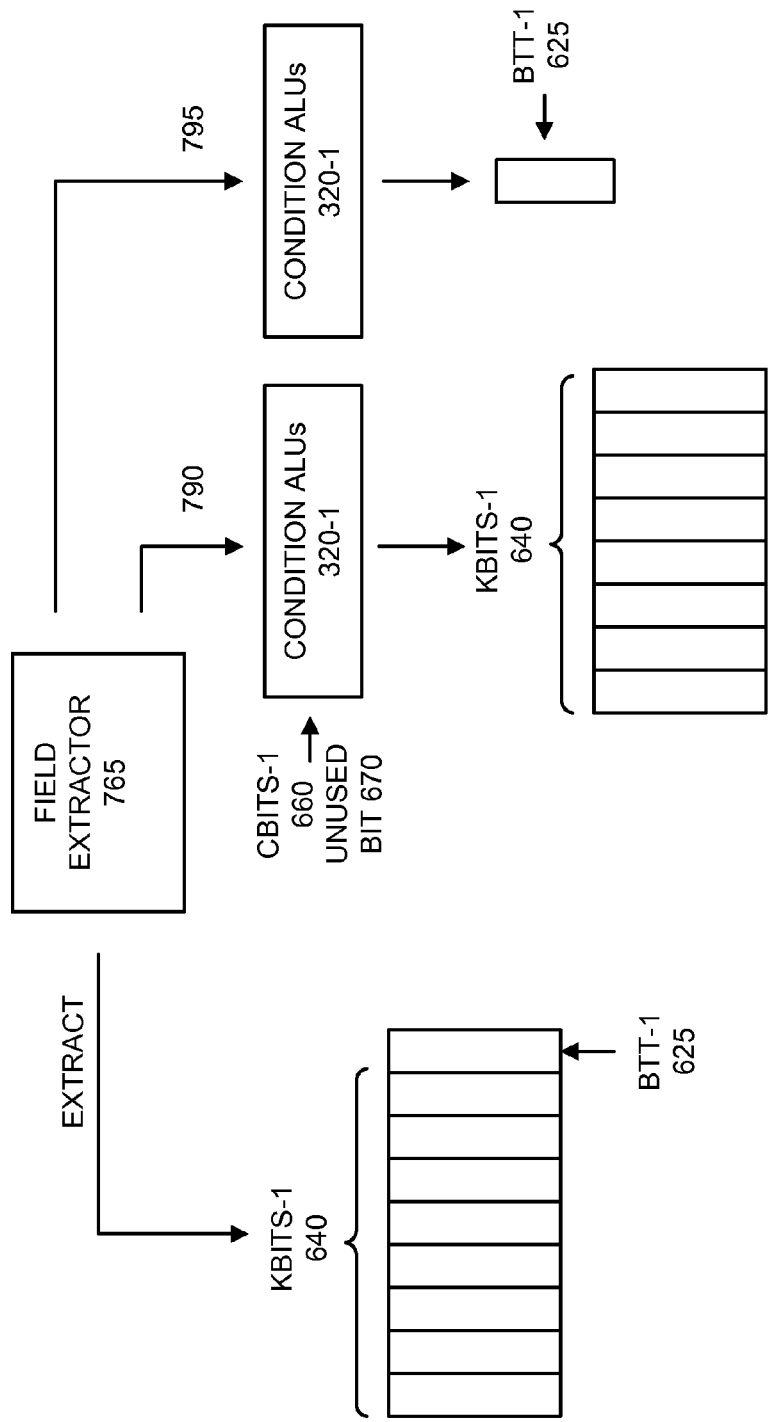

FIG. 7A is a flow diagram illustrating an exemplary process 700 for processing data 605. FIGS. 7B-7D are diagrams illustrating exemplary arrangements for processing data 605. In this example, the processing may involve a single extraction of two different bit fields, instead of two separate extractions, to perform multiple operations associated with the K-tree route lookup process.

Referring to FIG. 7A, process 700 may begin with extracting kbits and btt from a K-tree instruction (block 705). For example, as previously described, during route lookup, PPE 225 may compare the kbits and the BTT bit included in a K-tree instruction. FIG. 7B illustrates BTM 610, BTT 615, kbits 630, field extractor 765, and condition ALUs 320-1. In one embodiment, field extractor 765 may extract (e.g., read) kbits 630 and BTT 615 from data 605. This extracted portion (i.e., kbits 630 and BTT 615) of data 605 may be processed in the following manner. For example, field extractor 765 may pass 770 the extracted portion to conditional ALUs 320-1.

Returning to FIG. 7A, kbits and cbits may be compared (block 710). For example, as illustrated in FIG. 7B, condition ALUs 320-1 may determine whether kbits 630 match cbits 650. For example, cbits 650 and one of unused bits 665 may be extracted from a K-tree instruction and passed to condition ALUs 320-1. Condition ALUs 320-1 may mask the low bits (i.e., BTT 615 and unused bit 665) and may compare kbits 630 and cbits 650 to determine whether they are equivalent. If it is determined that kbits and cbits do not match (block 710-NO) (as illustrated in FIG. 7A), the K-tree search process may return to a last match of bits, or if no match exists, utilize a default address (block 715). On the other hand, if it is determined that kbits and cbits do match (block 710-YES), the value of BTT may be determined (block 720). For example, as illustrated in FIG. 7B, field extractor 765 may pass 775 the extracted portion to condition ALUs 320-1. Condition ALUs 320-1 may test BTT 615. For example, the extracted portion (i.e., kbits 630 and BTT 615) may be subjected to a logical test or to an arithmetic test to determine the value of BTT 615. Condition ALUs 320-1 may receive another input (e.g., a constant value) to perform the logical test or the arithmetic test. Depending on the determined value of BTT 615, the K-tree route lookup process may continue to test BTT-0 620 or BTT-1 625, as described below.

The K-tree route lookup process may, among other things, test BTT-0 620, when it is determined that BTT 615 is zero. Similar to FIG. 7B, the processing may involve a single extraction of two different bit fields, instead of two separate extractions, to perform multiple operations associated with the K-tree route lookup process.

Referring to FIG. 7A, kbits-0 and BTT-0 may be extracted (block 725). As previously described, during route lookup in the K-tree, PPE 225 may compare the kbits-0 and the BTT-0 bit included in a K-tree instruction. In one embodiment, field extractor 765 may extract (e.g., read) kbits-0 635 and BTT-0 620 from data 605, as illustrated in FIG. 7C. This extracted portion (i.e., kbits-0 635 and BTT-0 620) of data 605 may be processed in the following manner. For example, field extractor 765 may pass 780 the extracted portion to conditional ALUs 320-1.

Returning to FIG. 7A, kbits-0 and cbits-0 may be compared (block 730). For example, as illustrated in FIG. 7C, condition ALUs 320-1 may determine whether kbits-0 635 match cbits-0 655. Condition ALUs 320-1 may mask the low bits (i.e., BTT-0 620 and unused bit 670) and may compare kbits-0 635 and cbits-0 655 to determine whether they are equivalent. If it is determined that kbits-0 and cbits-0 do not match (block 730-NO) (as illustrated in FIG. 7A), the K-tree search process may return to a last match of bits (block 735). On the other hand, if it is determined that kbits-0 and cbits-0 do match (block 730-YES), the value of BTT-0 may be determined (block 740).

For example, as illustrated in FIG. 7C, field extractor 765 may pass 785 the extracted portion to condition ALUs 320-1. Condition ALUs 320-1 may test BTT-0 620. For example, the extracted portion (i.e., kbits-0 635 and BTT-0 620) may be subjected to a logical test or to an arithmetic test to determine the value of BTT-0 620. Condition ALUs 320-1 may receive another input (e.g., a constant value) to perform the logical test or the arithmetic test. Depending on the determined value of BTT-0 620, the K-tree route lookup process may continue to another K-tree instruction.

In the event that it is determined that the value of BTT 615 is a one, the K-tree route lookup process may continue to test BTT-1 625, as described below. Similar to FIG. 7B, the processing may involve a single extraction of two different bit fields, instead of two separate extractions, to perform multiple operations associated with the K-tree route lookup process.

Returning to FIG. 7A, kbits-1 and BTT-1 may be extracted (block 745). As previously described, during route lookup in the K-tree, PPE 225 may compare the kbits-1 and the BTT-1 bit included in a K-tree instruction. In one embodiment, field extractor 705 may extract (e.g., read) kbits-1 640 and BTT-1 625 from data 605, as illustrated in FIG. 7D. This extracted portion (i.e., kbits-1 640 and BTT-1 625) of data 605 may be processed in the following manner. For example, field extractor 705 may pass 790 the extracted portion to conditional ALUs 320-1.

Returning to FIG. 7A, kbits-1 and cbits-1 may be compared (block 750). For example, as illustrated in FIG. 7D, condition ALUs 320-1 may determine whether kbits-1 640 match cbits-1 660. Condition ALUs 320-1 may mask the low bits (i.e., BTT-1 625 and unused bit 670) and may compare kbits-1 640 and cbits-1 660 to determine whether they are equivalent. If it is determined that kbits-1 and cbits-1 do not match (block 750-NO) (as illustrated in FIG. 7A), the K-tree search process may return to a last match of bits (block 755). On the other hand, if it is determined that kbits-1 and cbits-1 do match (block 750-YES), the value of BTT-1 may be determined (block 760).

For example, as illustrated in FIG. 7D, field extractor 765 may pass 795 the extracted portion to condition ALUs 320-1. Condition ALUs 320-1 may test BTT-1 625. For example, the extracted portion (i.e., kbits-1 640 and BTT-1 625) may be subjected to a logical test or to an arithmetic test to determine the value of BTT-1 625. Condition ALUs 320 may receive another input (e.g., a constant value) to perform the logical test or the arithmetic test. Depending on the determined value of BTT-1 625, the K-tree route lookup process may continue to another K-tree instruction.

It will be appreciated, depending on the addresses in the K-tree, comparison of kbits 630, kbits-0 635 and/or kbits-1 640 with cbits 650, cbits-0 655, and/or cbits-1 660 may be omitted.

According to the embodiments described herein, network device 105 may perform routing functions in a manner that optimizes performance. For example, in one embodiment described herein, network device 105 may minimize the complexity of interpreting an instruction, such as a nexthop instruction, by utilizing dedicated components (e.g., address control field manager 465 and sub-routine return checker 570) to perform certain operations that otherwise may be implemented by one or more microcode instructions. As a result, the processing of the instruction may be minimized (e.g., additional microcode instructions may not be needed). Additionally, or alternatively, in the embodiments described below, network device 105 may limit access and/or read operations associated with an instruction set, such as a K-tree instruction set, during a routing lookup process. For example, when instructions are stored in a shared and/or an external memory resource (e.g., data memory 235), performance by various components (e.g., PPE 225) may be limited. However, minimizing access and/or the number of times to extract bit-fields contained in an instruction may enhance performance.

CONCLUSION

The foregoing description of embodiments provides an illustration, but is not intended to be exhaustive or to limit the embodiments to the precise form disclosed. Modifications and variations are possible in light of the above teachings or may be acquired from practice of the teachings.

In addition, while processes have been described and illustrated, the order of operations associated with these processes may be modified in other embodiments. Further, non-dependent operations may be performed in parallel. Further, it may be possible to omit an operation with respect a process described herein.

It will be apparent that aspects described herein may be implemented in many different forms of software, firmware, and hardware in the embodiments illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combination of features are recited in the claims and/or disclosed in the specification, these combinations are not intended to limit the invention. In fact, many of these features may be combined in ways not specifically recited in the claims and/or disclosed in the specification.

The term "may" is used throughout this application and is intended to be interpreted, for example, as "having the potential to," "configured to," or "being able," and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for emulating a nexthop instruction, the method comprising:
   reading, by a device, address control information from the nexthop instruction, the address control information including information to control at least one of read addressing or write addressing of a first memory;
   writing, by the device, the address control information to a second memory,
   where the second memory is different than the first memory, and
   where the address control information is written to the second memory to control the at least one of read addressing or write addressing of the first memory;
   reading, from the first memory, based on the address control information stored in the second memory; and
   determining a nexthop address based on reading from the first memory.

2. The method of claim 1, where the nexthop instruction is stored in a third memory that is different than the first memory and the second memory,
   the method further comprising:
   writing, by the device, the address control information to a field extractor or a field inserter; and
   determining the nexthop address based on writing to the field extractor or the field inserter.

3. A method for emulating a nexthop instruction, the method comprising:
   executing a sub-routine call based on an address included in the nexthop instruction,
   where executing the sub-routine call includes executing one or more nexthop instructions based on the address;
   receiving, after executing the sub-routine call, a nexthop read request that includes a nexthop read address;
   comparing, by a device, a particular value stored in a memory to the nexthop read address;
   providing, by the device, a result of the comparison to a packet processing engine; and
   executing the nexthop read request when the result of the comparison indicates that the nexthop read address does not match the particular value.

4. The method of claim 3, where the particular value includes a constant value.

5. The method of claim 4, further comprising:
   omitting execution of the nexthop read request when the result of the comparison indicates that the nexthop read address matches the particular value;
   receiving a nexthop return address from a nexthop address stack;
   referencing a nexthop table based on the nexthop return address; and
   executing a nexthop microinstruction based on the nexthop table.

6. The method of claim 3, further comprising:
   referencing a nexthop table based on the nexthop read request, when the nexthop read address does not match the particular value; and
   executing a nexthop microinstruction based on the nexthop table.

7. A method comprising:
   extracting a plurality of bit fields from a route lookup instruction used to perform a route lookup search in a routing address data structure, where the plurality of bit fields include a test bit field, a skipped bits field, and a comparative skipped bits field;

providing the plurality of bit fields to a bits field comparer;
masking the test bit field;
comparing the skipped bits field to the comparative skipped bits field;
determining whether the skipped bits field matches the comparative skipped bits field;
determining a value of the test bit field, when the skipped bits field matches the comparative skipped bits field; and
selecting a route address in the routing data structure based on the value of the test bit field.

8. The method of claim 7, where, when the test bit field corresponds to a bit value of one, the method further comprises:
extracting a second plurality of bit fields from a second route lookup instruction, where the second plurality of bit fields include a second test bit field and a second skipped bits field;
providing the second plurality of bit fields to the bits field comparer;
comparing the second skipped bits field to a second comparative skipped bits field;
determining whether the second skipped bits field matches the second comparative skipped bits field;
determining a second value of the second test bit field, when the second skipped bits field matches the second comparative skipped bits field; and
selecting a second route address in the routing data structure based on the second value of the second test bit field.

9. The method of claim 7, where, when the test bit field corresponds to a bit value of zero, the method further comprises:
extracting a second plurality of bit fields from a second route lookup instruction, where the second plurality of bit fields include a second test bit field and a second skipped bits field;
providing the second plurality of bit fields to the bits field comparer;
comparing the second skipped bits field to a second comparative skipped bits field;
determining whether the second skipped bits field matches the second comparative skipped bits field;
determining a second value of the second test bit field, when the second skipped bits field matches the second comparative skipped bits field; and
selecting a second route address in the routing data structure based on the second value of the second test bit field.

10. The method of claim 7, further comprising:
determining that the skipped bits field does not match the comparative skipped bits field; and
determining last matched bits based on determining that the skipped bits field does not match the comparative skipped bits field.

11. A device, comprising:
a packet processing engine to determine a network address for routing a received packet based on an emulation of a nexthop instruction in microcode; and
dedicated hardware to:
extract an address control field from the nexthop instruction, the address control field including information to control at least one of read addressing or write addressing of a first memory; and
insert the address control field information to at least one of a second memory, a field extractor, or a field inserter,
where the packet processing engine utilizes the address control field information of the second memory to control the at least one of the read addressing or the write addressing of the first memory.

12. The device of claim 11, where the second memory includes a pointer register and the first memory includes a memory local to the packet processing engine.

13. The device of claim 11, where the nexthop instruction is stored in a memory external to the packet processing engine.

14. The device of claim 11, further comprising:
an arithmetic logic unit to calculate an address offset based on the address control field information inserted in the field extractor or the field inserter.

15. A device, comprising:
an engine to determine a network address based on an emulation of a nexthop instruction in microcode; and
dedicated hardware to:
identify that a last nexthop instruction, of a plurality of nexthop instructions associated with a sub-routine call, has been executed,
where the sub-routine call is associated with an address included in the nexthop instruction,
compare a nexthop read address included in a nexthop read request issued by the engine to a particular value, after the last nexthop instruction has been executed, and
indicate whether the nexthop read address matches or does not match the particular value,
where the engine executes the nexthop read request when the nexthop read address does not match the particular value, and
where a microinstruction is executed based on a another nexthop instruction corresponding to the nexthop read address.

16. The device of claim 15, further comprising:
a nexthop return handler to return a nexthop read address to the engine when the nexthop read address matches the particular value,
where the engine references, based on the returned nexthop read address, a nexthop table to determine a microinstruction to be executed.

17. A device, comprising;
a packet processing engine to determine a network address based on a search of a binary tree according to one or more tree instructions, and
dedicated hardware to:
extract a plurality of bit fields from one of the one or more tree instructions, where the plurality of bit fields include a test bit, a skipped bits field, and a comparative skipped bits field, and
provide the plurality of bit fields to a first bits field comparer,
where the first bits field comparer determines whether the skipped bits field matches the comparative skipped bits field, and
where the dedicated hardware provides the test bit field to a second bits field comparer when the skipped bits field matches the comparative skipped bits field, and
where the second bits field comparer determines whether the value of the test bit field is a one or a zero.

18. The device of claim 17, where the dedicated hardware is further to at least one of:
extract a second plurality of bit fields from another one of the one or more tree instructions, and provide the second plurality of bit fields to the first bits field comparer, where the second plurality of bit fields include a second test bit and a second skipped bits field, when the test bit field is equal to zero, or
extract a third plurality of bit fields from another one of the one or more tree instructions, and provide the third plurality of bit fields to the first bits field comparer, where the third plurality of bit fields include a third test bit and a third skipped bits field, when the test bit field is equal to one.

19. A non-transitory computer-readable medium including instructions executable by at least one processor, the instructions comprising:

- one or more instructions to extract a plurality of bit fields from a route lookup instruction used to perform a route lookup search in a routing address data structure, where the plurality of bit fields include a test bit field, a skipped bits field, and a comparative skipped bits field;
- one or more instructions to provide the plurality of bit fields to a bits field comparer;
- one or more instructions to compare the skipped bits field to the comparative skipped bits field;
- one or more instructions to determine whether the skipped bits field matches the comparative skipped bits field;
- one or more instructions to determine a value of the test bit field, when the skipped bits field matches the comparative skipped bits field; and
- one or more instructions to select a route address in the routing data structure based on the value of the test bit field.

20. The non-transitory computer-readable medium of claim 19, where, when the test bit field corresponds to a bit value of one, the instructions further comprise:

- one or more instructions to extract a second plurality of bit fields from a second route lookup instruction, where the second plurality of bit fields include a second test bit field and a second skipped bits field;
- one or more instructions to provide the second plurality of bit fields to the bits field comparer;
- one or more instructions to compare the second skipped bits field to a second comparative skipped bits field;
- one or more instructions to determine whether the second skipped bits field matches the second comparative skipped bits field;
- one or more instructions to determine a second value of the second test bit field, when the second skipped bits field matches the second comparative skipped bits field; and
- one or more instructions to select a second route address in the routing data structure based on the second value of the second test bit field.

21. The non-transitory computer-readable medium of claim 19, the instructions further comprising:

- one or more instructions to determine that the skipped bits field does not match the comparative skipped bits field; and
- one or more instructions to determine last matched bits based on the one or more instructions to determine that the skipped bits field does not match the comparative skipped bits field.

* * * * *

UNITED STATES PATENT AND TRADEMARK OFFICE
CERTIFICATE OF CORRECTION

| | | |
|---|---|---|
| PATENT NO. | : 8,069,023 B1 | Page 1 of 1 |
| APPLICATION NO. | : 12/202742 | |
| DATED | : November 29, 2011 | |
| INVENTOR(S) | : Jean-Marc Frailong et al. | |

It is certified that error appears in the above-identified patent and that said Letters Patent is hereby corrected as shown below:

Claim 15 (Column 16, line 29) after "based on" delete "a".

Claim 18 (Column 17, line 3) after "field" delete ",".

Signed and Sealed this
Tenth Day of April, 2012

David J. Kappos
*Director of the United States Patent and Trademark Office*